Figure 1:
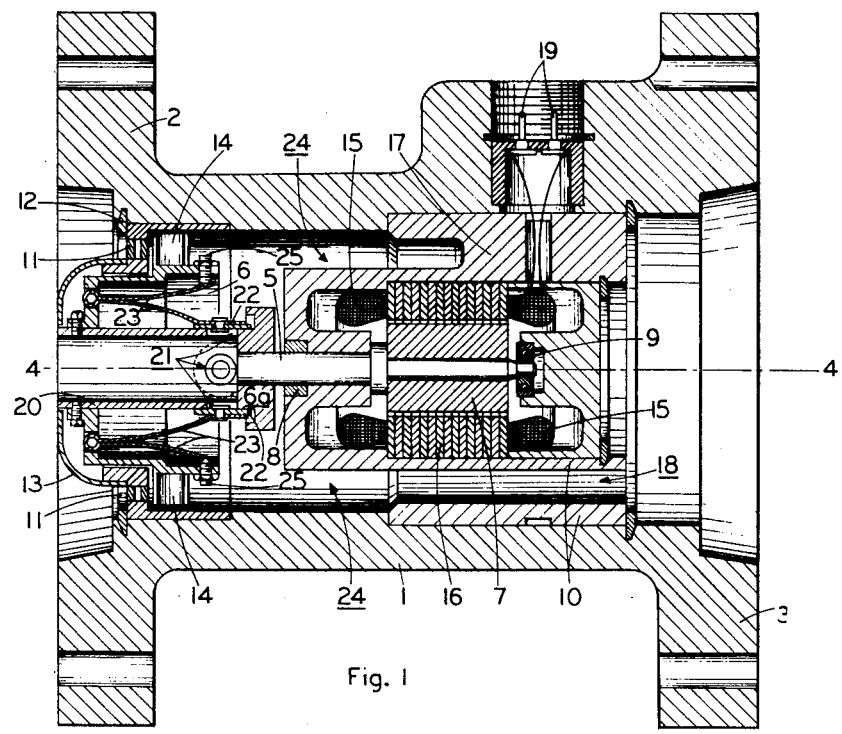

Dec. 15, 1959   L. T. AKELEY   2,917,637
FREQUENCY-REGULATED TURBO GENERATOR
Filed June 10, 1957

Inventor:
Lloyd T. Akeley
by James E. Wroce
His Attorney

United States Patent Office 2,917,637
Patented Dec. 15, 1959

2,917,637

FREQUENCY-REGULATED TURBO GENERATOR

Lloyd T. Akeley, Topsfield, Mass., assignor to General Electric Company, a corporation of New York Application June 10, 1957, Serial No. 664,680

10 Claims. (Cl. 290—52)

The present invention relates to frequency-regulated turbo generators and, more particularly, to novel and improved fluid-driven electrical generators wherein electrical output characteristics are accurately governed over extended ranges of fluid flow.

Instrumentation and control of industrial processes at locations remote from reliable sources of electric power have occasioned need for isolated power generating plants; and it has been recognized that in some instances the conditions to be measured or controlled may themselves afford a convenient source of motive energy. This occurs in the case of certain fluid pipelines, for example, where the flowing gaseous or liquid fluid may actuate a suitable turbine which in turn may function as a prime mover for a generator or other allied equipment. While simple unregulated or crudely regulated turbines may prove satisfactory for many purposes, there are others which may demand very precisely uniform output speeds and substantial independence of such speeds in relation to the rate of flow of the actuating fluid. One application involving the latter requirements is that of mass rate flow-metering in gas pipelines, it being necessary there that a synchronous electric impeller motor for the flowmeter detector be excited by an alternating current of an unvarying predetermined frequency despite appreciable variations in pipeline flow conditions. Where a fluid turbine in the line is employed to drive an A.-C. electric generator which excites the flowmeter motor, its output frequency is subject to deviation and variation which are ultimately reflected in inaccurate flow measurements, such that only a fluid turbine having a particularly precise speed regulation over extensive flow ranges will suffice.

Accordingly, it is one of the objects of the present invention to provide novel and improved fluid turbine apparatus which sensitively preserves a predetermined rotational speed with high accuracy over extended fluid flow ranges and variable load conditions.

A further object is to provide fluid turbine apparatus having a fast-response speed controller as a component part thereof which imparts improved speed-regulation characteristics.

An additional object is to provide a speed-regulated fluid turbine apparatus having centrifugally actuated and substantially frictionless by-pass valving arrangements which operate with high sensitivity and preserve low pressure drops.

By way of a summary account of this invention in one of its aspects, I provide a generally cylindrical housing adapted to be coupled into a fluid pipeline and having therein an upstream turbine wheel having a plurality of blades or buckets and being coupled in driving relationship to the rotor of a downstream electrical generator. Stationary upstream deflecting vanes direct incoming fluid in one angular sense such that it impinges upon the turbine buckets and occasions turbine rotation in one direction. Without more, the turbine speed and generator output would vary with the fluid flow in the associated pipeline; and in correcting for this deficiency, a plurality of by-pass fluid paths are provided through the rotatable turbine structure. Each of these paths is associated with a weighted flapper valve disposed to block the by-pass path under influence of an adjustable bifurcated spring having its juncture end fixed in relation to the rotatable turbine structure, the spring bias and valve seating being such that centrifugal forces above a predetermined level tend to move the valves and open the by-pass paths by varying amounts without attendant sliding friction. By-passed fluid flow is unable to impart rotational energy to the turbine, and instead tends to dampen its movement, such that a predetermined speed of turbine rotation and consequent predetermined generator output are realized.

Figure 2:
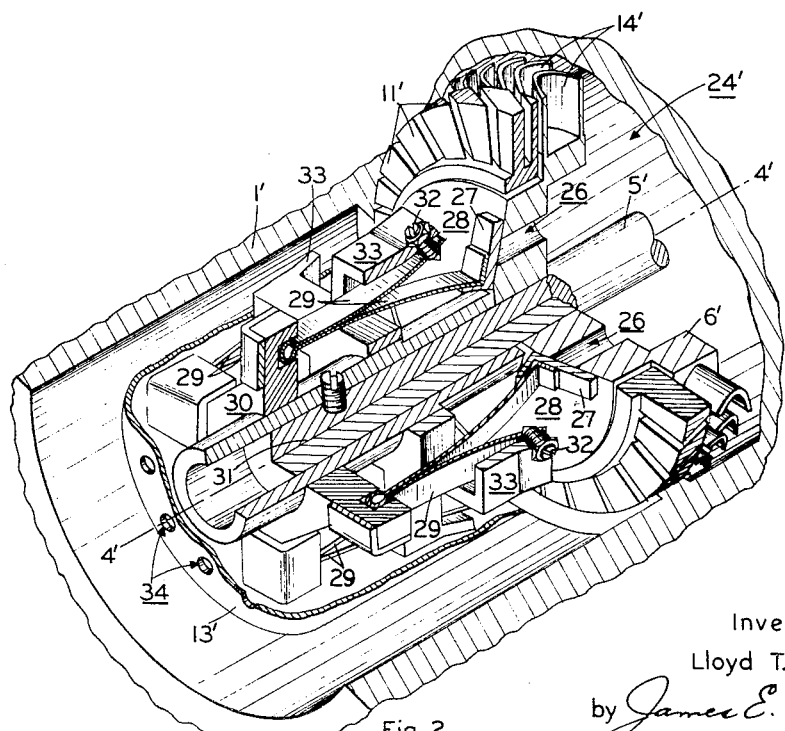

Although the features of this invention which are believed to be novel are set forth in the appended claims, further details of the invention and the objects and advantages thereof may be readily comprehended through reference to the following description taken in connection with the accompanying drawing, wherein:

Figure 1 is a sectioned side view of a regulated turbo generator embodying teachings of this invention; and Figure 2 provides a partly cutaway isometric view of a portion of an alternative regulated turbo generator in which these teachings are practiced.

The arrangement depicted in Figure 1 includes a generally cylindrical hollow casing 1 adapted for coupling into a fluid pipeline at its upstream and downstream ends by way of upstream and downstream coupling flanges 2 and 3, respectively. Within this casing, and in alignment with the central longitudinal axis 4—4 thereof is disposed a rotatable shaft 5 which carries a turbine wheel assembly 6 near its upstream end and a diametrically magnetized generator rotor 7 near its downstream end. Shaft 5 is afforded rotational freedom about axis 4—4 by support bearings 8 and 9 appearing in the generator housing and bracket 10 fixed centrally within casing 1. At the upstream end of this unit there appears a further stationary assembly including an annular array of skewed fluid-deflecting vanes or nozzles 11 extending radially outward from axis 4—4, the narrow fluid passages therebetween being oriented to direct flowing fluid in one net angular direction about this axis. Retaining ring 12 preserves this nozzle array in position, and a streamlined shroud 13 directs at least part of the flow into nozzles 11 with a minimum of turbulence.

Fluid leaving the vanes or nozzles 11 impinges upon turbine buckets 14 which are closely spaced in a cooperating annular array peripherally about the turbine wheel assembly 6, whereby reaction forces cause spinning of rotor shaft 5 and resultant generation of induced A.-C. electrical signals in the stator winding 15 of the generator stator 16. Downstream bracket 10 is an integral part of the enclosed housing for the generator, and integral radial strut portions such as that cross-sectioned at 17 provide the spacing for an annular fluid passageway 18 about the generator such that the fluid may be exhausted downstream while cooling the generator housing.

Neglecting, for the moment, the effects of speed regulating components, it should be clear that as pipeline fluid flow increases and decreases, the turbine rotor shaft 5 will tend to increase and decrease in speed, whereby the frequencies of output signals appearing at terminals 19 will likewise vary because of the altered speeds of movement of the generator rotor 7 in relation to stator windings 15. In avoidance of this, an automatically controlled fluid by-pass path is afforded such that critical amounts of the fluid flow may be bled away from paths through the nozzles and turbine buckets as speeds exceed a given value. The by-pass path is formed by a central hollow cylindrical hub member 20 the upstream open end of which projects through the shroud 13 to permit entry of the flowing fluid. Hub member 20 serves also as part of the turbine wheel assembly, and is mounted for rotation with the driven rotor shaft 5. The downstream portions of by-pass member 20 are blocked except for plural side openings 21 each of which may at times be uncovered by a different one of the associated flapper valves 22. These valves are restrained against radial movement about axis 4—4 by adjustable springs 23, and when turbine wheel speeds are not excessive the valves 22 seat on the hub 20 and obstruct fluid flow which would otherwise tend to travel through by-pass member 20 and thence through openings 21 to downstream passage 24 in avoidance of the nozzles and turbine buckets. It will be observed that the valve-restraining springs 23 are of bifurcated construction, each with the two leaves thereof spreading apart at their downstream free ends and with their juncture fixedly held in an accommodating upstream locating recess in the turbine wheel structure. One leaf of each spring mounts to a weighted valve member 22 for movement in a by-pass passage opening direction corresponding to the direction of fluid flow through the by-pass passage in the hub and in an opposite by-pass passage closing direction. The other leaf or leg of each spring is engageable by an adjusting screw 25 fitted into turbine wheel 6 for radial adjustments which will alter the radial spring forces on valve 22. With this construction, the biasing springs occupy little space radially while yet affording needed high and accurately predetermined restraining forces and while remaining virtually independent of uncertain friction forces often associated with other forms of spring assemblies. Both leaves of each spring abut one another near their juncture, such that their net radial spring characteristic will be adjustable by adjusting screw movements varying compression of these leaves and altering their influence on one another.

As flowing fluid drives turbine wheel 6 above a desired predetermined speed, the equal-weight valves 22 rotating with it experience centrifugal forces proportioned to their weight and are lifted radially outwardly against the restraining forces of springs 23 and directly away from the openings 21 without any attendant sliding frictional engagement with the hub. Openings 21 at the downstream end of the hollow hub or by-pass member 20 are then uncovered and permit egress of by-passed fluid to the downstream passage 24 without driving influence upon the turbine wheel. The net flow through nozzles 11 and buckets 14 is thus reduced, which tends to reduce the turbine wheel speed until it reaches the desired value. Limit stop member 6a, which is part of the turbine wheel assembly, prevents valves 22 from exceeding a reasonable radial travel.

As will be observed from a consideration of Fig. 1 when the valve members 22 are seated on the turbine wheel, the pressure drop across the valve members will tend to open the same against the forces of the springs 23. However, upon opening of the valve members in response to excessive speed of the turbine wheel, the pressure drop across the valve members will be reduced thus increasing the net closing forces thereon. The result is an inherent positive feedback which stabilizes the operation of the valve members and hence stabilizes regulation of the speed of the turbine. The closeness of regulation obtainable with this valve arrangement is superior to that obtainable in an arrangement wherein there is a pressure drop across the valve members of a sense tending to close the by-pass openings rather than open them. In one embodiment wherein the turbine wheel was to be rotated at a predetermined speed of 3600 r.p.m. to yield a 60-cycle per second two-pole generator output, the regulation proved to be within 1 to 2 cycles per second over a gaseous flow range of 350 to 1750 pounds per hour with a generator output of about 50 watts.

In the alternative embodiment portrayed in Figure 2, the regulating components are disposed on the upstream side of the turbine wheel and the by-pass flow occurs through longitudinal openings or passages in the turbine wheel extending parallel to and spaced radially outwardly of the axis of rotation of the turbine wheel. For convenience and simplification purposes, those elements corresponding to elements of the apparatus of Figure 1 are identified by the same reference characters bearing distinguishing single prime accents. When a predetermined turbine speed is not exceeded, the longitudinal by-pass passages 26 in turbine wheel 6' are covered on the upstream side by weighted flapper valves 27, whereby the principal fluid flow through housing 1 is about the stationary streamlined shroud 13', into the array of nozzles 11', and through the turbine buckets 14' to the downstream passage 24'. Upon occurrence of higher flow, the momentarily excessive turbine wheel speed causes the rotating assembly of flapper valves 27 to experience centrifugal forces which tend to lift them from the upstream conical surface 28 of turbine wheel 6' against the restraint imposed by bifurcated springs 29. These springs have their leaf junctures fixed to and recessed within bracket 30 which are mounted on the upstream extension 31 of shaft 5', and spring compression adjusting screws 32 are also affixed to a further bracket 33. Operation of springs 29 is like that earlier described in connection with springs 23 for the apparatus of Figure 1, it being particularly noted that the springs guide movements of valves 27 such that the valve surfaces move essentially perpendicularly toward and away from the mating conical surfaces 28. In this manner, uncertain sliding friction effects which might be associated with common valve opening and closing steps are eliminated.

Lifting of valves 27 exposes the upstream openings of by-pass passages 26 to fluid which has entered shroud 13' through its upstream openings 34. The fluid flowing through the passages 26 will be angularly accelerated about the axis of the turbine wheel in response to rotation of the turbine wheel and this will absorb angular momentum from the wheel. As will be apparent, any increase in the rate of fluid flow through the by-pass passages will tend to increase the momentum absorbed from the wheel and tend to reduce the rotational speed of the wheel. Thus, as an increased fluid flow through the conduit in which the casing is coupled tends to increase turbine speed beyond a predetermined value, more fluid will be permitted to be by-passed through the turbine wheel by the valve members 27 so as to tend to reduce the speed of the turbine; at the same time the increase in flow of fluid through the by-pass passages 26 in the turbine wheel, with the attendant increased absorption of turbine momentum, will also tend to reduce the speed of the turbine. Conversely, when turbine wheel tends to decrease due to decrease of fluid flow through the conduit, the quantity of fluid by-passed around the turbine will be reduced by the valve members 27 so as to tend to increase turbine speed and at the same time the reduction in fluid flowing through the turbine wheel by-pass passages will reduce the absorption of momentum from the turbine wheel due to the fluid flow through the by-pass passage thus tending to increase the speed of rotation of the turbine. The speed regulation of the turbine is materially improved over turbine devices wherein by-pass passages are provided externally of the turbine wheel. As is apparent from Fig. 1, the effect of the fluid flowing through the passages in the turbine wheel 6 of Fig. 1 formed by the side openings 21 in the hub will be to absorb angular momentum from the turbine wheel in the manner described in connection with the passages 26 in the turbine wheel 6' so as to improve the speed regulation of the turbine wheel of Fig. 1 in a manner similar to that described above in connection with the embodiment of Fig. 2.

While particular preferred embodiments of this invention have been illustrated and described herein, it should be apparent to those skilled in the art that various changes,

What I claim as new and desire to secure by Letters Patent of the United States is:

1. In a speed regulated fluid driven turbine device having a casing adapted to conduct fluid, a turbine wheel rotatably mounted in the casing and having a plurality of turbine blades, and a load drivingly connected to the turbine: said turbine wheel being provided with a fluid flow passage therein separate from that provided by the turbine blades for diverting fluid flowing through said casing around the turbine blades, at least a portion of said passage being disposed relative to the axis of rotation of the turbine wheel to provide angular acceleration of fluid flowing through said portion about said axis during rotation of the turbine wheel, a valve member disposed in the path of fluid flow through said passage to regulate the rate of flow of fluid through the passage and thus the rate of flow of fluid through the turbine wheel, and means mounting the valve member for rotation with the turbine wheel and for resiliently restrained movement in a passage opening direction in response to a predetermined centrifugal force on the valve member corresponding to a predetermined speed of rotation of the turbine wheel.

2. In a speed regulated fluid driven turbine device having a casing adapted to conduct fluid, a turbine wheel rotatably mounted in the casing and having a plurality of turbine blades, and a load drivingly connected to the turbine: said turbine wheel being provided with a fluid flow by-pass passage opening at each end into the interior of said casing for diverting a portion of fluid flowing through the casing through the turbine wheel and around the turbine blades, at least a portion of said by-pass passage being disposed relative to the rotational axis of the turbine wheel to provide angular acceleration of fluid flowing through said portion of the passage in a direction about said axis during rotation of the turbine wheel, a valve member for controlling the flow of fluid through said passage, and means mounting the valve member on the turbine wheel in closed relationship with said passage and for resiliently restrained movement in a passage opening direction in response to a predetermined centrifugal force thereon corresponding to a predetermined speed of rotation of the turbine wheel, said valve member being constructed and arranged to provide one surface thereon facing inwardly of said passage and another surface thereon facing generally in the direction corresponding to the passage opening direction of movement of the valve member and exposed to the interior of said casing on the downstream side of the turbine wheel.

3. Speed-regulated fluid turbine apparatus comprising a casing adapted to conduct fluid flow, a fluid-driven turbine wheel mounted for rotation within said casing about an axis, a load driven by said turbine wheel, said turbine wheel having a fluid by-pass passage therethrough for by-passing fluid from a position upstream in relation to said turbine wheel to a position downstream in relation to said turbine wheel, a valve member disposed for opening and closing said passage from the downstream side of said turbine wheel, and resilient means mounted on said turbine wheel holding said valve member angularly fixed about said axis and resiliently urging said valve member into closing relationship with said passage, said valve member being movable by centrifugal force against restraint of said resilient means to open said passage when said turbine wheel exceeds a predetermined speed of rotation.

4. Speed-regulated fluid turbine apparatus comprising a casing adapted to conduct fluid flow, a fluid-driven turbine wheel mounted for rotation within said casing about an axis and having turbine buckets thereon, a load driven by said turbine wheel, said turbine wheel having a central tubular hub portion having an open end upstream in relation to said turbine wheel and a side opening downstream in relation to said turbine wheel, a valve member disposed outside said hub portion for opening and closing said opening, and resilient means mounted on said turbine wheel holding said valve member angularly fixed about said axis and resiliently biasing said valve member radially into closing relationship with said passage, said valve member being movable by centrifugal force against restraint of said biasing means to open said opening when said turbine wheel exceeds a predetermined speed of rotation and to permit fluid flow through said hub portion in avoidance of said turbine buckets.

5. Speed-regulated fluid turbine apparatus comprising a casing adapted to conduct fluid flow, a fluid-driven turbine wheel mounted for rotation within said casing about an axis, a load driven by said turbine wheel, said turbine wheel having a fluid by-pass passage therethrough for directing fluid from a position upstream in relation to said turbine wheel to a position downstream in relation to said turbine wheel, said passage having an opening to one of said positions directed radially outward from said axis, a valve member shaped for closure of said opening, leaf spring means mounting said valve member on said turbine wheel for rotation therewith in a fixed angular relationship to said turbine wheel and urging said valve member radially inward toward said axis and toward a closing relationship to said opening without sliding friction between said valve member and said turbine wheel, said valve member being movable by centrifugal force radially outward against restraint of said leaf spring means to open said passage without sliding friction when said turbine wheel exceeds a predetermined speed of rotation.

6. Speed-regulated fluid turbine apparatus comprising a casing adapted to conduct fluid flow, a fluid-driven turbine wheel mounted for rotation within said casing and having turbine buckets thereon, a load driven by said turbine wheel, said turbine wheel having a plurality of longitudinal fluid by-pass passages therethrough separate from that provided by the turbine buckets and substantially parallel with and radially displaced from the axis of the turbine wheel to provide angular acceleration of the fluid flowing through said passages upon rotation of said turbine wheel and disposed to conduct fluid from a position upstream in relation to said turbine wheel to a position downstream in relation to said turbine wheel, said passages each having an opening to one of said positions, a plurality of valve members each shaped for closure of one of said openings, a plurality of leaf springs each mounting a different one of said valve members on said turbine wheel for rotation therewith in a fixed angular relationship to said turbine wheel and urging said valve members toward closing relationships to said openings without sliding friction between said valve members and said turbine wheel, means mounted on said turbine wheel for adjusting the forces of said springs in urging said valve members toward said closing relationships, said valve members being movable by centrifugal force against restraint of said leaf springs to open said longitudinal passages to flow of fluid when said turbine wheel exceeds a predetermined speed of rotation, whereby said flow of fluid through said longitudinal passages decreases the speed of rotation of said turbine wheel to said predetermined speed.

7. Speed-regulated fluid turbine apparatus comprising a casing adapted to conduct fluid flow, a fluid-driven turbine wheel mounted for rotation within said casing and having an annular peripheral array of turbine buckets thereon, said turbine wheel having a plurality of longitudinal fluid by-pass passages therethrough separate from that provided by the turbine buckets and substantially parallel with and radially displaced from the axis of the turbine wheel to provide angular acceleration of the fluid flowing through said passages upon rotation of said turbine wheel and disposed to conduct fluid from a position upstream in relation to said turbine wheel to a position downstream in relation to said turbine wheel, said passages each having an opening to one of said positions, a plurality of valve members each shaped for closure of one of said openings, a plurality of leaf springs each mounting a different one of said valve members on said turbine wheel for rotation therewith in a fixed angular relationship to said turbine wheel and urging said valve members toward closing relationships to said openings without sliding friction between said valve members and said turbine wheel, means mounted on said turbine wheel for adjusting the forces of said springs in urging said valve members toward said closing relationships, a permanent magnet rotor mounted for rotation by said turbine wheel within said casing in downstream relationship to said turbine wheel, and a generator stator including windings disposed in inductive relationship to said rotor downstream of said turbine wheel and in position to be cooled by fluid flowing through said casing, said valve members being movable by centrifugal force against restraint of said leaf springs to open said longitudinal passages to flow of fluid when said turbine wheel exceeds a predetermined speed of rotation, whereby said flow of fluid through said longitudinal passages decreases the speed of rotation of said turbine wheel to said predetermined speed and preserves the induced electrical output signals in said stator windings at a predetermined value.

8. In a speed regulated fluid driven turbine device having a casing adapted to conduct fluid, a turbine wheel rotatably mounted in the casing and having a plurality of turbine blades, and a load drivingly connected to the turbine: said turbine wheel being provided with a fluid flow passage therein separate from that provided by the turbine blades with one end of said passage being disposed for communication with fluid entering the casing and with the other end of said passage being disposed relative to the turbine blades so that the rate of flow of fluid through said passage determines the rate of flow of fluid through the turbine blades, at least a portion of said passage being disposed relative to the rotational axis of the turbine wheel to provide angular acceleration of fluid flowing through said portion of the passage in a direction about said axis and in response to rotation of the turbine wheel, and valve means carried by the turbine wheel for controlling the flow of fluid through said passage responsive to speed of rotation of the turbine wheel.

9. In a speed regulated fluid driven turbine device having a casing adapted to conduct fluid, a turbine wheel rotatably mounted in the casing and having a plurality of turbine blades, and a load drivingly connected to the turbine: said turbine wheel being provided with a fluid flow passage therein separate from that provided by the turbine blades with one end of said passage being disposed for communication with fluid entering the casing and with the other end of said passage being disposed relative to the turbine blades so that the rate of flow of fluid through said passage determines the rate of flow of fluid through the turbine blades, at least a portion of said passage being disposed relative to the rotational axis of the turbine wheel to provide angular acceleration of fluid flowing through said portion of the passage in a direction about said axis and in response to rotation of the turbine wheel, a valve member disposed in the path of fluid flow through said passage to control the rate of fluid flow therethrough and means mounting the valve member for rotation with the turbine wheel and for resiliently restrained movement in a passage opening direction in response to a predetermined centrifugal force on the valve member corresponding to a predetermined speed of rotation of the turbine wheel.

10. In a fluid driven turbine device, a casing adapted to conduct fluid, a turbine wheel rotatably mounted in the casing provided with a plurality of turbine blades, the turbine wheel further being provided with a fluid flow passage extending therethrough and separate from that provided by the turbine blades, means for controlling the speed of rotation of the turbine wheel including said passage and a valve member constructed and arranged to be seated on the turbine wheel for closing one end of said passage, a bifurcated leaf spring having a pair of legs connected at one end thereof and mounted on the turbine wheel at said one end, the valve member being carried by the free end of one of said legs for resiliently restrained initial movement in a passage opening direction in response to centrifugal force thereon corresponding to a predetermined speed of rotation of the turbine wheel, the other leg extending over said one leg and abutting the same adjacent said one end and being spaced therefrom at its free end, and means adjustably supported on the turbine wheel and engaging said other leg adjacent its free end for adjusting the spacing of the free ends of said legs to vary the valve member biasing force of said one leg.

References Cited in the file of this patent

UNITED STATES PATENTS

| | | |
|---|---|---|
| 806,154 | Lombard | Dec. 5, 1905 |
| 1,002,669 | Gelpke | Sept. 5, 1911 |
| 1,035,116 | Gelpke | Aug. 6, 1912 |
| 1,202,310 | Pfau | Oct. 24, 1916 |
| 1,309,808 | Pfau | July 15, 1919 |
| 1,704,403 | Nash | Mar. 5, 1929 |
| 1,751,982 | Dunham | Mar. 25, 1930 |
| 2,308,135 | White | Jan. 12, 1943 |